March 31, 1970 R. OLSON ET AL 3,503,595

HEATING APPARATUS WITH CONVEYOR

Filed July 1, 1968

United States Patent Office 3,503,595
Patented Mar. 31, 1970

3,503,595
HEATING APPARATUS WITH CONVEYOR
Robert Olson, 404 N. Main, Hillsboro, Kans. 67063, and
Roy Mitchell, 924 N. 1st, Ponca City, Okla. 74601
Filed July 1, 1968, Ser. No. 741,670
Int. Cl. F27b 9/18
U.S. Cl. 263—6                    9 Claims

ABSTRACT OF THE DISCLOSURE

The present invention contemplates apparatus useful in applying uniform heat to a series of workpieces and includes an elonagted conveyor means upon which the workpieces are moved. A heating enclosure is provided which cooperates with a vertically movable heated platform which in its lowermost position is adjacent the discharge end of the conveyor to receive workpieces therefrom. Means are provided for moving the heated platform with a workpiece thereon into a position relative to the heating enclosure such that the workpiece is totally enclosed by heat radiating surfaces. Ram means are provided and are operated in timed relationship with the movable platform to move workpieces serially onto the surface of the platform.

BACKGROUND

In many industrial situations it is necessary to uniformly, serially, and, preferably, automatically heat a plurality of workpieces. The present invention is directed to apparatus for achieving this result and has particular application in cheese handling. It is common practice to age relatively large blocks of cheese in a substantially anaerobic atmosphere for a substantial period of time. The anaerobic atmosphere is commonly provided by shrinking around each one of the cheese blocks a plastic sheet which, upon being uniformly heated, shrinks into close engagement with the cheese thereby forming an air tight, relatively permanent seal.

Prior to the present invention, the heat shrinkable plastic has been placed on the blocks of cheese and thereafter the blocks were manually placed in a heating oven one at a time. The heating ovens used for this purpose are relatively awkward pieces of equipment which require a substantial amount of hand labor to close and thereafter discharge.

The present invention was designed to preclude the necessity for manual operations of heating ovens used in cheese sealing applications. Until this invention, a satisfactory apparatus for semiautomatically heating heat-shrinkable plastic films over cheese blocks had remained an elusive desideratum.

DESCRIPTION OF DRAWINGS

Various features of one embodiment of the present invention are disclosed in the accompanying drawings wherein.

GENERAL DESCRIPTION OF THE INVENTION

Figure 1:
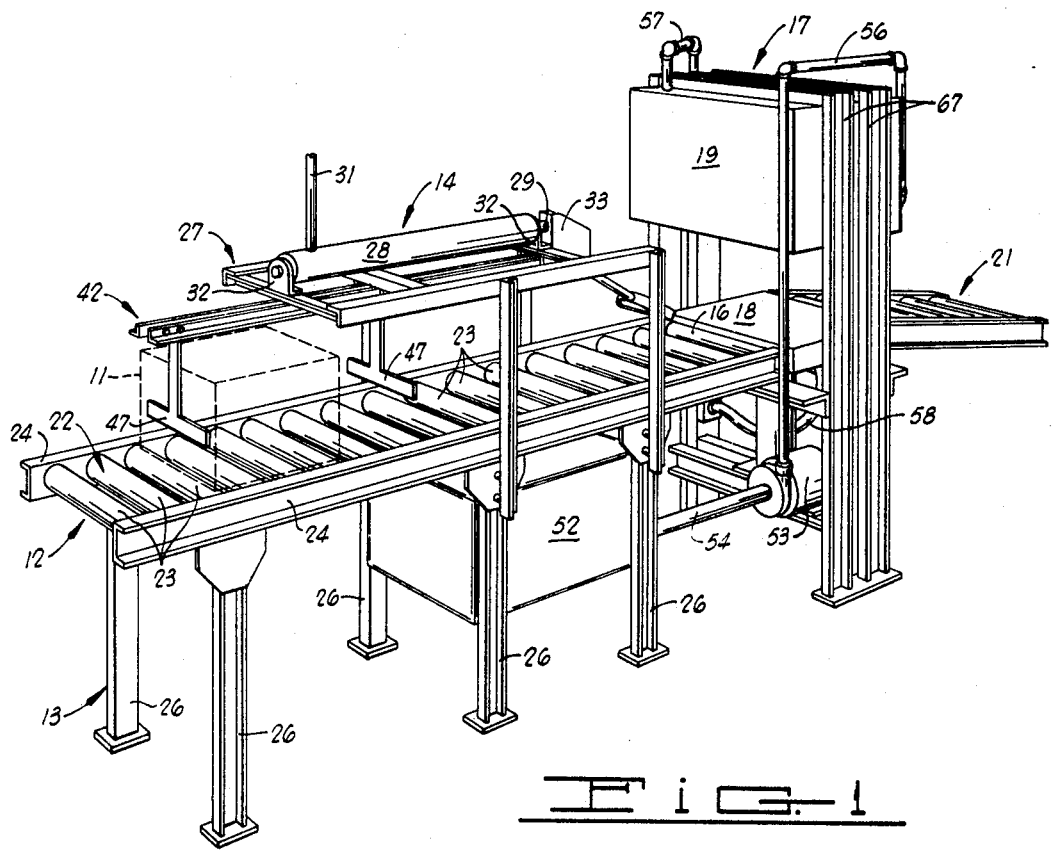
FIGURE 1 is a general perspective view of one form of apparatus embodying the present invention showing the relationship between a ram assembly for moving a plurality of workpieces along a conveyor means into heat applying means.

The general form of apparatus embodying this invention is disclosed in FIGURE 1 and an initial reference to this figure is helpful to establish a general understanding of the major mechanical elements utilized in this embodiment. Basically, the machine shown in the drawings is utilized to heat a series of workpieces indicated in dotted line by the number 11. While these workpieces may be a variety of forms and compositions, the primary utility for which the present invention is envisioned lies in the realm of heat shrinking plastic sheets onto workpieces consisting of green cheese. Thus, in the following portions of this document whenever reference is made to workpieces it will ordinarily be made specifically to cheese blocks.

In FIGURE 1 cheese block 11 are first wrapped in heat-shrinkable plastic and thereafter placed at a receiving end 22 of conveyor means indicated generally by number 12 which is carried and supported by support means indicated generally by number 13. Cheese blocks 11 are moved along conveyor means 12 by a ram assembly indicated generally by the number 14. At the discharge end 16 of conveyor means 12 cheese blocks 11 are serially placed on a portion of a heat applying means indicated generally by the number 17. Thereafter a heated platform 18, which forms a portion of heat applying means 17 and which receives cheese blocks 11 from the conveyor, moves upwardly into a heating enclosure 19 which likewise forms a portion of heat applying means 17. Subsequently after a sufficient period of time has elapsed for the plastic around cheese block 11 to be thoroughly heated and shrunk, platform 18 returns to the down position shown in FIGURE 1 and the ram assembly 14 is actuated to position another cheese block 11 onto the platform, thus pushing the previously heated cheese block onto a discharge conveyor 21.

SPECIFIC STRUCTURE OF THE CONVEYOR AND SUPPORT MEANS

Conveyor means 12, onto which the workpieces 11 are positioned, comprises a plurality of rollers 23 which are rotatably journaled between a pair of parallel sidebars 24 in a manner well-known to those skilled in the art. Secured to each sidebar 24 are a plurality of upstanding legs 26 which thereby support conveyor means 12. In addition, support means 13 also includes a ram holder assembly 27 which is secured near the middle of conveyor means 12 in a manner which will become obvious by reference to FIGURE 1. Since the ram holder assembly 27 forms no part of the present invention, as such, and further since it may assume one of several forms depending upon the availability of materials and the taste of the mechanic, further details of this portion of the structure will not be undertaken.

SPECIFIC STRUCTURE OF THE RAM ASSEMBLY

Figure 2:
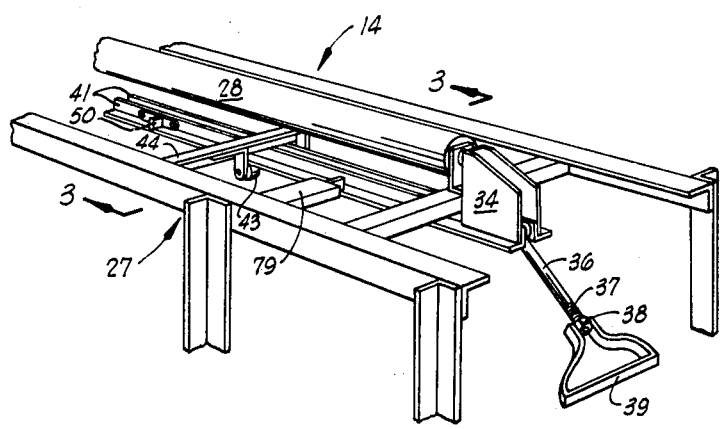
FIGURE 2 is an enlarged view of the ram assembly disclosed in FIGURE 1 showing a stirrup assembly which contacts a workpiece on the conveyor means shown in FIGURE 1.

Ram assembly 14 is carried on ram holder assembly 27 and is shown in substantial detail in FIGURE 2 wherein it will be seen that the ram assembly includes a pneumatic ram cylinder 28. In the present embodiment, cylinder 28 contains an internal solenoid-valve arrangement such that a single momentary closing of the single control switch which is connected to the solenoid actuates cylinder 28 to send its push rod 29 to full stroke and return it immediately to its original position. An example of this type of pneumatic cylinder may be found in Model VER–R–AL which is sold by the Allenair Corp., 255 E. 2nd Street, Mineola, N.Y. Pressurized gas is ducted into cylinder 28 from a source, not shown, through pressure conduit 31 and cylinder 28 is secured to ram holder assembly 27 by means of an L-shaped clevis 32 located on opposite ends of cylinder 28.

At the end of push rod 29 is carried a stirrup assembly indicated generally by the number 33 which comprises a bridging box 34, the upper portion of which is secured to push rod 29. Adjacent the lower edge of bridging box 34 is pivotally secured a rod 36, the outer end of which is threaded as at 37. Cooperating with threads 37 is a lead nut 38 which forms a portion of a stirrup 39 positioned by rod 36 in the path of workpieces located on conveyor means 12. An internal stop member, not shown, prevents clockwise motion of stirrup assembly 33 beyond the position shown in FIGURE 2 while allowing counterclockwise motion as the stirrup assembly 33 is pulled to the left, as viewed in FIGURE 3, over and behind workpieces. This internal stop is of a structure substantially identical to that shown in FIGURE 4 which is disclosed hereinafter.

Stirrup assembly 33 is secured to and moves with a pair of back-to-back, parallel angle irons 41 which extend immediately below and parallel to cylinder 28. As shown in further detail in FIGURE 3, these parallel angle irons which together form a reciprocal arm indicated generally at 42 are supported from ram holder assembly 27 by a plurality of rollers 43 which are themselves mounted in position from a crossbar 44 of the ram holder assembly by means of journal members 46.

Figures 3, 4:
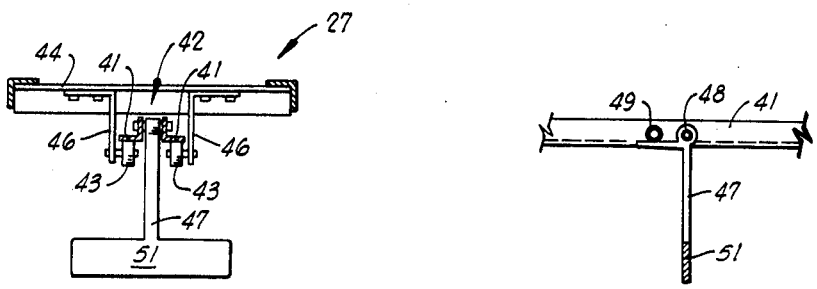
FIGURE 3 is a detailed cross-sectional view taken along line 3—3 of FIGURE 2 showing the mechanism whereby a portion of the ram assembly is supported.
FIGURE 4 is a fragmentary view taken along the center line of a portion of the ram assembly showing the operation of a bell crank assembly.

Positioned between angle irons 41 and rotatably supported thereby are a plurality of bell crank assemblies 47 having a structure shown in detail in FIGURES 3 and 4. As shown best in FIGURE 4, these bell crank assemblies are rotatably journaled between angle irons 41 by means of a pin 48 which bridges the gap between angle irons 41. A stop member 49 is likewise secured between angle irons 41 in a position to prevent clockwise motion of the bell crank assemblies beyond the position shown in FIGURE 4, while at the same time allowing counterclockwise motion of the assembly. The lower portion 51 of bell crank assemblies 47 has an inverted T shape with the horizontal portion of the T being designed to engage and move workpieces 11 located on conveyor means 12.

A switch actuator 50 is carried by reciprocal arm 42 and positioned thereon so as to engage a timing motor starting switch 79 as more particularly described hereinafter.

SPECIFIC DETAILS OF HEAT APPLYING MEANS 17

Figure 6:
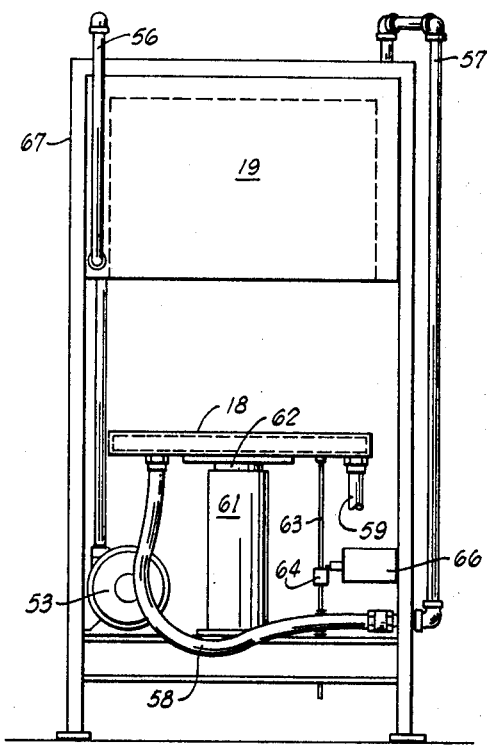
FIGURE 6 is an enlarged side-elevational view of a portion of the heat applying mechanism when viewed from the right as viewed in FIGURE 1.

The structural details of heat applying means 17 may be understood from a reference to FIGURES 1 and 6 wherein it will be seen that heated platform 18 and heating enclosure 19 both have double walled construction as indicated by dotted outline in FIGURE 6 to provide a heat chamber between the walls of each one of these elements. The chambers thus formed receive steam from a steam reservoir 52 located below support means 13. A pump 53 communicates with steam reservoir 52 through a conduit 54 and serves to force fluid into an overhead conduit 56 which, as seen most clearly in FIGURE 6, communicates with the lower portion of the heating enclosure 19. Steam which is thus discharged into the double walled area of heating enclosure 19 completely surrounds the interior of enclosure 19 before being discharged from the enclosure on its upper surface through an exhaust conduit 57. Conduit 57 carries the steam downwardly into a flexible pipe 58 which communicates with the interior of platform 18. A return conduit 59, a portion of which is shown in FIGURE 6, is provided to return steam from the interior of platform 18 back to steam reservoir 52.

In order to insure rigidity and alignment of heating enclosure 19, a pair of inverted U-shaped support members 67 formed of I-beams are provided, as shown most clearly in FIGURE 1. The remaining portions of the specific support structure for the heat applying means will be obvious from a reference to FIGURES 1 and 6 and form no critical portion of the present invention, being a matter of mechanic's choice.

ELEVATOR MEANS

Platform 18 is vertically reciprocated by elevator means which, in the present embodiment, includes a pneumatic elevator cylinder 61. A push rod 62 connects cylinder 61 with the bottom portion of platform 18 so that upon actuation of cylinder 61 the platform is raised, and upon deactuation of the cylinder platform 18 is lowered. A control rod 63 is likewise secured to the bottom of platform 18 and carries an enlarged switch actuator 64 which contacts a one-way, close-open switch 66 secured to support means 13 immediately under platform 18. Switch 66 is not considered to be a portion of the elevator but is rather one element of the timing means to be hereinafter described.

CONTROL CIRCUITRY

Figure 5:
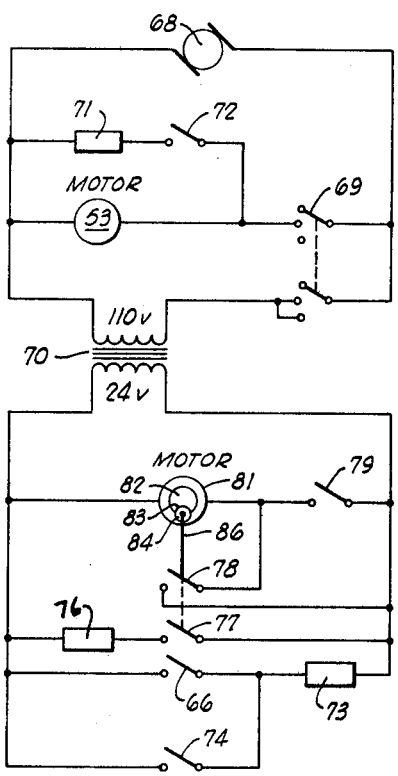
FIGURE 5 is a schematic electrical circuit diagram showing one form of electric circuitry useful for controlling the opeartion of the apparatus shown in FIGURE 1.

One form of circuitry which is useful for sequencing and controlling the operation of the various elements previously disclosed is shown in FIGURE 5. To this circuitry electric current is provided by means of a 110 v. generator 68 which is in a closed loop with a 110 v. −24 v. transformer 70. In parallel with generator 68 is pump motor 53, which is actuated on closing of a ganged switch 69. Also in parallel with the generator is a solenoid 71 which controls the flow of heat into steam reservoir 52 and which is itself controlled by a thermostatic switch 72 located in return conduit 59.

In the 24 v. loop of the control circuitry there is provided a ram solenoid 73 which controls the input of fluid pressure to ram cylinder 28. In series with ram solenoid 73 is a pair of parallel switches including a momentarily closed starting switch 74 for the ram and a one-way, close-open ram switch 66 which is actuated upon downward motion of elevator platform 18. Elevator solenoid 76 is parallel with ram solenoid 73 and in series with elevator switch 77 which is ganged with a motor control switch 78. Motor control switch 78 is in parallel with a ram operated, timing motor starting switch 79 and in series with a timing motor 81 to maintain the circuit to the motor during rotation of a cam plate 82. Timing motor 81 carries thereon the cam plate 82 which is depressed as at 83 and which engages on its periphery a switch follower 84. Elevator switch 77 and motor control switch 78 are connected to switch follower 84 by means indicated generally at 86.

OPERATION

Immediately prior to operation of the device shown in the drawings the relative parts of the device are in the positions shown in FIGURE 1 and workpieces 11 are placed on conveyor means 12 near the receiving end 22 thereof. When it is desired to begin operation of the device a cheese block is placed in front of stirrup 39 and, after closing ganged switch 69, switch 74 is momentarily depressed. Upon depression of switch 74 solenoid 73 opens to duct compressed air into ram cylinder 28. It should be kept in mind that solenoid 73 is an internal portion of ram cylinder 28 and has associated with it a timing mechanism which allows the solenoid to remain open for a predetermined length of time. As ram cylinder 28 moves push rod 29 forward, bridging box 34 causes movement of stirrup assembly 33 to position a cheese block on the surface of platform 18. Simultaneously bell crank assemblies 47 position additional cheese blocks along conveyor means 12. Stirrup 39 can be rotated to adjust its position with relation to rod 36 and thereby insure precise alignment between the vertical sides of the cheese block 11 and the interior portion of heating enclosure 19 when the cheese block is located on platform 18.

As reciprocal arm 42 is thus moved into its extended position, switch actuator 50 momentarily closes timing motor starting switch 79 to initiate actuation of timing motor 81. As this takes place, cam 82 beings to rotate and thereby pushes switch follower 84 downwardly as viewed in FIGURE 5 to close motor control switch 78 as well as elevator switch 77. Upon closing of switch 77, elevator solenoid 76 opens to duct compressed fluid into the pneumatic elevator cylinder 61. Pressurization of cylinder 61 results in elevation of platform 18 into a position at which the lower portion of the platform is flush with the lower portion of heating enclosure 19. The elevator remains in this position as timing motor 81 continues to move cam plate 82. At such time as the depression 83 formed on the cam plate reaches the position shown in FIGURE 5, switch 78 is opened to stop the timing motor and simultaneously switch 77 is opened to inactivate elevator solenoid 76 thus lowering the platform into the position shown in FIGURE 6.

As platform 18 approaches its lowermost position, switch actuator 64 momentarily engages switch 66 to reactivate ram solenoid 73 and thus recycle the mechanism.

When it is desired to stop the machine, switch 69 is opened during actuation of ram cylinder 28.

It will be understood that various changes in the details, materials, steps, and arrangement of parts, which have been herein described and illustrated in order to explain the nature of the invention may be made by those skilled in the art within the principle and scope of the invention.

What is claimed is:

1. Apparatus for applying heat to a series of workpieces which comprises:
   (a) conveyor means having a receiving end and a discharge end;
   (b) heat applying means immediately adjacent the discharge end of said conveyor means, said heat applying means comprising,
      (1) a heating enclosure having one side thereof open to receive a workpiece,
      (2) a heated platform movable in a vertical direction between a position immediately adjacent the discharge end of said conveyor and a position immediately adjacent the open side of said heating enclosure, and
      (3) means for transmitting heat to said heating enclosure and to said platform;
   (c) elevator means for moving said platform toward and away from said heating enclosure;
   (d) support means on which said conveyor means is mounted;
   (e) a ram assembly carried by said support means and spaced from said conveyor means for moving a plurality of workpieces along said conveyor from said receiving end and said discharge end and onto said platform; said ram assembly comprising:
      (1) a pneumatic ram cylinder mounted above said conveyor means and substantially parallel thereto;
      (2) a push rod secured to said ram cylinder for motion toward and away from said heat applying means, and
      (3) a stirrup assembly secured to the end of said push rod opposite the pneumatic cylinder, a portion of said stirrup assembly extending downwardly from said cylinder into a position to engage said workpiece; and
   (f) means for timing the motion of said ram assembly and said elevator means whereby said ram assembly is actuated to move a workpiece from the discharge end of said conveyor means onto said platform when said platform is in a position immediately adjacent the discharge end of said conveyor means.

2. The apparatus defined in claim 1 further characterized by:
   (a) a reciprocal arm secured to a portion of said stirrup assembly and extending in a direction therefrom parallel to said pneumatic cylinder;
   (b) at least one bell crank assembly depending from said reciprocal arm in a direction toward the conveyor means and in a position to engage a workpiece carried by said conveyor means whereby said bell crank assembly moves said workpiece upon motion of said reciprocal arm toward the heat applying means; and
   (c) means carried on said support means for engaging and supporting the reciprocal arm.

3. The apparatus defined in claim 2 wherein said elevator means comprises:
   (a) a pneumatic elevator cylinder positioned below said heated platform; and
   (b) a connecting rod secured to and movable by said elevator cylinder, the end of said connecting rod opposite said cylinder being secured to the underside of the heated platform.

4. The apparatus defined in claim 3 wherein said heated enclosure and said heated platform each are double walled to receive a heating fluid therein.

5. The apparatus defined in claim 4 wherein said means for transmitting heat to the heating enclosure and to the platform comprises:
   (a) a reservoir for heated fluid;
   (b) pump means communicating with said reservoir for moving said heating fluid therefrom; and
   (c) a conduit assembly communicating with the upstream portion of said pump means and the heating enclosure and heated platform whereby heating fluid is moved from said reservoir through said pump and into the heating enclosure and platform.

6. The apparatus defined in claim 4 wherein said timing means comprises an electrical circuit including:
   (a) a ram solenoid for controlling a supply of pressurized fluid to the ram cylinder;
   (b) an elevator solenoid for controlling the supply of pressurized fluid to the elevator cylinder;
   (c) a timing motor;
   (d) an elevator switch closed during actuation of said timing motor, said switch being in series with said elevator solenoid;
   (e) a first switch in series with said timing motor for starting said motor, said first switch being positioned on said support to be momentarily closed when the reciprocal arm is in a position approaching said heat applying means;
   (f) a second switch in series with said timing motor, said second switch being positioned to be closed while said timing motor is actuated;
   (g) a one-way, close-open ram switch positioned adjacent said heated platform and in series with said ram solenoid;
   (h) a switching rod carried by said platform for momentarily closing said ram switch upon downward motion of said platform; and
   (i) a starting switch in series with said ram solenoid.

7. The apparatus defined in claim 5 wherein said timing means comprises an electrical circuit including:
   (a) a ram solenoid for controlling a supply of pressurized fluid to the ram cylinder;
   (b) an elevator solenoid for controlling the supply of pressurized fluid to the elevator cylinder;
   (c) a timing motor;

(d) an elevator switch closed during actuation of said timing motor, said switch being in series with said elevator solenoid;

(e) a first switch in series with said timing motor for starting said motor, said first switch being positioned on said support to be momentarily closed when the reciprocal arm is in a position approaching said heat applying means;

(f) a second switch in series with said timing motor, said second switch being positioned to be closed while said timing motor is actuated;

(g) a one-way, close-open ram switch positioned adjacent said heated platform and in series with said ram solenoid;

(h) a switching rod carried by said platform for momentarily closing said ram switch upon downward motion of said platform; and (i) a starting switch in series with said ram solenoid.

8. Apparatus for applying heat to a series of workpieces which comprises:

(a) conveyor means having a receiving end and a discharge end;

(b) heat applying means immediately adjacent the discharge end of said conveyor means, said heat applying means comprising, (1) a heating enclosure having one side thereof open to receive a workpiece, (2) a heated platform movable in a vertical direction between a position immediately adjacent the discharge end of said conveyor and a position immediately adjacent the open side of said heating enclosure, and (3) means for transmitting heat to said heating enclosure and to said platform;

(c) elevator means for moving said platform toward and away from said heating enclosure, said elevator means comprising:

(1) a pneumatic elevator cylinder positioned below said heated platform, and (2) a connecting rod secured to and movable by said elevator cylinder, the end of said connecting rod opposite said cylinder being secured to the underside of the heated platform;

(d) support means on which said conveyor means is mounted;

(e) a ram assembly carried by said support means and spaced from said conveyor means for moving a plurality of workpieces along said conveyor from said receiving end and said discharge end and onto said platform; and (f) means for timing the motion of said ram assembly and said elevator means whereby said ram assembly is actuated to move a workpiece from the discharge end of said conveyor means onto said platform when said platform is in a position immediately adjacent the discharge end of said conveyor means.

9. The apparatus defined in claim 8 wherein said heated enclosure and said heated platform each are double walled to receive a heating fluid therein.

References Cited

UNITED STATES PATENTS 3,137,485   6/1964   Johnson et al. _____ 263—6

JOHN J. CAMBY, Primary Examiner